United States Patent [19]

Kishita et al.

[11] Patent Number: 5,087,720
[45] Date of Patent: Feb. 11, 1992

[54] POLYSILETHYLENESILOXANE

[75] Inventors: Hirofumi Kishita; Shinichi Sato; Hitoshi Kinami; Toshio Takago; Kenichi Fukuda; Hirokazu Yamada, all of Annaka, Japan

[73] Assignee: Shin-Etsu Chemical Co., Ltd., Tokyo, Japan

[21] Appl. No.: 726,335

[22] Filed: Jul. 5, 1991

[30] Foreign Application Priority Data

Jul. 6, 1990 [JP] Japan .................................. 2-178727
Jul. 6, 1990 [JP] Japan .................................. 2-178729
Jul. 6, 1990 [JP] Japan .................................. 2-178731

[51] Int. Cl.$^5$ .............................................. C07L 7/08
[52] U.S. Cl. ................................................. 556/434
[58] Field of Search ..................................... 556/434

[56] References Cited

U.S. PATENT DOCUMENTS 3,269,983 8/1966 Holbrook .................. 556/434 X
3,336,352 8/1967 Omietauski ................ 556/434 X
4,057,566 11/1977 Carter et al. ................ 556/434
4,802,725 1/1989 Arai et al. ................... 556/434

Primary Examiner—Paul F. Shaver
Attorney, Agent, or Firm—Oblon, Spivak, McClelland, Maier & Neustadt

[57] ABSTRACT

A polysilethylenesiloxane having the following formula:

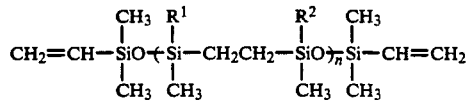

wherein $R^1$ and $R^2$ are each a methyl group or a perfluoroalkyl group. The polysilethylenesiloxane has excellent resistance to acid, alkali, etc., and are curable to produce rubber products having excellent mechanical strength.

9 Claims, 7 Drawing Sheets

POLYSILETHYLENESILOXANE

BACKGROUND OF THE INVENTION

1. Field of the Invention

This invention relates to a novel polysilethylenesiloxane.

2. Description of the Prior Art

Dimethylpolysiloxanes have excellent heat resistance, cold resistance and weather resistance as well as excellent rubber elasticity, release properties, electrical properties, etc., and are used as a main constituent of various rubber materials, coating materials, etc. in a wide range of fields such as building materials, transport equipment and instruments, household electric appliances, office machines, and so on. The characteristic properties of the dimethylpolysiloxanes arise from the high bond energy of siloxane bonds constituting the backbone chain, their ionic bonding properties and the low cohesive force between siloxane molecules.

Dimethylpolysiloxanes, however, are susceptible to cleavage of the backbone chain by ionic reagents such as acid, alkali, etc. and are unsatisfactory in mechanical strength.

SUMMARY OF THE INVENTION

It is accordingly an object of this invention to provide a novel polysiloxane compound which overcome the aforementioned drawbacks of dimethylpolysiloxanes.

According to this invention there is provided a polysilethylenesiloxane having the following general formula [I]:

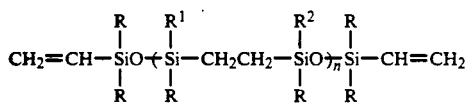

wherein R may be the same or different and are each a monovalent hydrocarbon group of from 1 to 10 carbon atoms, $R^1$ and $R^2$ may be the same or different and are each a monovalent hydrocarbon group of from 1 to 10 carbon atoms or a perfluoroalkylethyl group, and n is an integer of from 10 to 1,000.

The polysilethylenesiloxane of this invention is markedly characterized by the silethylene linkages introduced into the siloxane backbone chain. Due to the silethylene bonds, the polysilethylenesiloxane has excellent resistance to acid and alkali. In addition, the polysilethylenesiloxane of the invention is curable to produce rubber products excellent in mechanical strength. Moreover, fluorine-containing polysilethylenesiloxanes in which at least one of the above groups $R^1$ and $R^2$ is a perfluoroalkyl group exhibit low swellability in organic solvents, machine oils, etc. as well as remarkably improved release properties, water repellency and oil repellency.

DETAILED DESCRIPTION OF THE INVENTION

Figure 1:
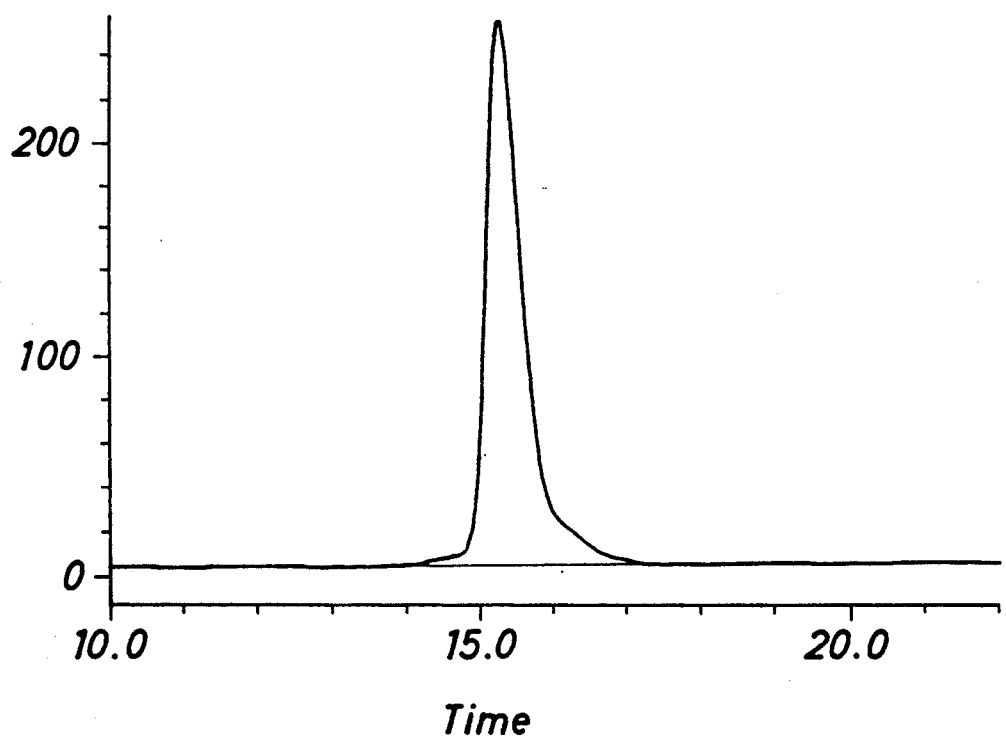
FIG. 1 shows a GPC chart of a polymer synthesized in Example 1.

In the general formula [I] above, the R are each a monovalent hydrocarbon group having from 1 to 10 carbon atoms. Exemplary R include lower alkyl groups of up to 8 carbon atoms such as methyl, ethyl, propyl, etc.; cycloalkyl groups such as cyclohexyl, etc.; alkenyl groups such as vinyl, allyl, isopropenyl, etc.; aryl groups such as phenyl, tolyl, naphthyl, etc.; and aralkyl groups such as benzyl, 2-phenylethyl, etc. These R groups may be the same or different from each other. The most preferred R in this invention are lower alkyl groups, especially methyl.

The groups $R^1$ and $R^2$ are each a monovalent hydrocarbon group of from 1 to 10 carbon atoms or a perfluoroalkylethyl group. The monovalent hydrocarbon groups of from 1 to 10 carbon atoms include, for example, those exemplified above for R, and are preferably lower alkyl groups of up to 8 carbon atoms, most preferably the methyl group. On the other hand, the perfluoroalkylethyl group includes, e.g., those having the following formula:

$$-CH_2CH_2C_mF_{2m+1}$$

wherein m is a positive integer, preferably an integer of up to 10. Examples of the perfluoroalkylethyl group include specifically $CF_3CH_2CH_2-$, $(CF_3)_2CFCH_2CH_2-$, $C_4F_9CH_2CH_2-$, $C_6F_{13}CH_2CH_2-$, $C_8F_{17}CH_2CH_2-$, and $C_{10}F_{21}CH_2CH_2-$.

In this invention, fluorine-containing polysilethylenesiloxanes in which one or both of the $R^1$ and $R^2$ are perfluoroalkylethyl groups as described above exhibit low swellability in organic solvents, machine oils, etc., and are excellent in such properties as release properties, water repellency, oil repellency, and so on.

In the general formula [I], n is an integer of from 10 to 1,000. Due to such a value of n, the polysilethylenesiloxanes of this invention have a viscosity at 25° C. of from 25 to 500,000 cSt, preferably from 1,000 to 100,000 cSt.

Preparation process

The polysilethylenesiloxane according to this invention can be synthesized by a variety of processes. A typical one of the processes comprises subjecting a five-membered cyclic silethylenesiloxane having the following general formula [II]:

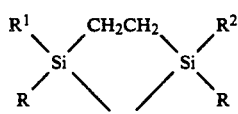

wherein $R^1$ and $R^2$ are as defined above, to ring-opening polymerization in which a divinyldisiloxane having the following formula [III]:

wherein R is as defined above, is used as a chain transfer agent.

The ring-opening polymerization is generally carried out by heating in the presence of a polymerization catalyst. The heating temperature may be determined depending on the 5-membered cyclic silethylenesiloxane used. For example, a heating temperature in the range from 10° to 200° C. is preferred in the case of a cyclic silethylenesiloxane in which at least one of the above groups $R^1$ and $R^2$ is a perfluoroalkylethyl group (such a cyclic silethylenesiloxane will be hereinafter referred to simply as "fluorine-containing cyclic siloxane"). In other cases, a heating temperature of from 50° to 200° C. is suitable. As the polymerization catalyst, hydroxides and silanolates of alkali metals such as lithium, potassium, sodium, etc. can be used suitably. In addition, the acid catalysts, alkali catalysts and the like which have been conventionally used for ring-opening polymerization of dimethylpolysiloxanes can also be employed. The polymerization catalyst is used in a suitable amount, which varies depending on the kind of the catalyst and of the 5-membered cyclic silethylenesiloxane used. The suitable catalyst amount is, for example, from 0.001 to 5 parts by weight per 100 parts by weight of the siloxane in the cases of the fluorine-containing cyclic siloxanes, and is from 0.001 to 1 part by weight per 100 parts by weight of the siloxane in other cases.

The chain transfer agent, is used preferably in an amount of from 0.1 to 15 parts by weight per 100 parts by weight of the 5-membered cyclic silethylenesiloxane.

The 5-membered cyclic silethylenesiloxane of the general formula [II] used for preparing the polysilethylenesiloxane according to this invention can be prepared easily by hydrolysis of a dichlorosilane having the following general formula [IV]:

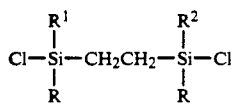

wherein R, $R^1$ and $R^2$ are as defined above.

The polysilethylenesiloxane of this invention, obtained in the manner as above, is a liquid polymer which has a molecular structure represented by the general formula [I], is excellent in such properties as chemical resistance, water repellency, electrical properties, etc. and is quite useful as a main constituent of elastomers having high strength and high elongation. For instance, the polysilethylenesiloxanes of this invention can be cured by cross-linking reactions conventionally used for silicone compounds to give cured rubber products having the properties described above.

EXAMPLES

Example 1

A 300-ml four-neck flask equipped with a condenser, agitating blades and a thermometer was charged with 100 g (0.625 mol) of a cyclic siloxane having the following formula:

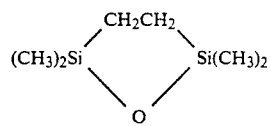

and 0.35 g ($2.08 \times 10^{-3}$ mol) of a divinyldisiloxane having the following formula:

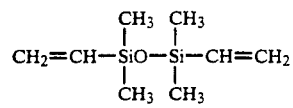

and the resultant mixture was heated to 100° C. with agitation.

Next, potassium silanolate was added to the liquid mixture in such an amount as to give an Si/K atomic ratio of 5,000. After 2 minutes, heat generation occurred to raise the temperature inside the flask to 150° C. The reaction mixture was subjected to maturing as such at a bath temperature of 100° C. for 3 hours. Then 1 g of tetrachloroethane as a neutralizing agent was added to the reaction mixture, followed by further maturing at 100° C. for 1 hour.

After the reaction mixture was cooled to room temperature, 0.5 g of activated carbon was added thereto, followed by stirring for 1 hour, and then 50 g of toluene was poured into the flask to dissolve the resultant polymer. The solution was filtered under pressure, and the filtrate was stripped by an evaporator under a reduced pressure of 3 mmHg at 100° C. for 2 hours, to yield 90.5 g of an oily matter.

The oil had a viscosity at 25° C. of 4,881 cSt.

Analyses of the oil by GPC, vinyl group determination, infrared absorption spectrum and $^1$H-NMR techniques gave the following results.

GPC

Measuring apparatus: HLC-8020, a product by Tosoh K.K.

Measuring conditions:
  Column: one G2500 column plus and one G4000 column
  Solvent: Fron 113
  Flow rate: 1 ml/min
  Detector: differential refractometer
  Temperature: 35° C.

The GPC chart obtained is shown in FIG. 1.

As is seen from the chart, a monodisperse pattern was obtained.

Vinyl group determination
  0.004 mol/100 g $^1$H-NMR: in CCl$_4$, internal standard: CHCl$_3$
  δ (ppm)
  0 15 (s, Si—CH$_3$, 12H)
  0.50 (s, Si—CH$_2$, 12H)

Figure 2:
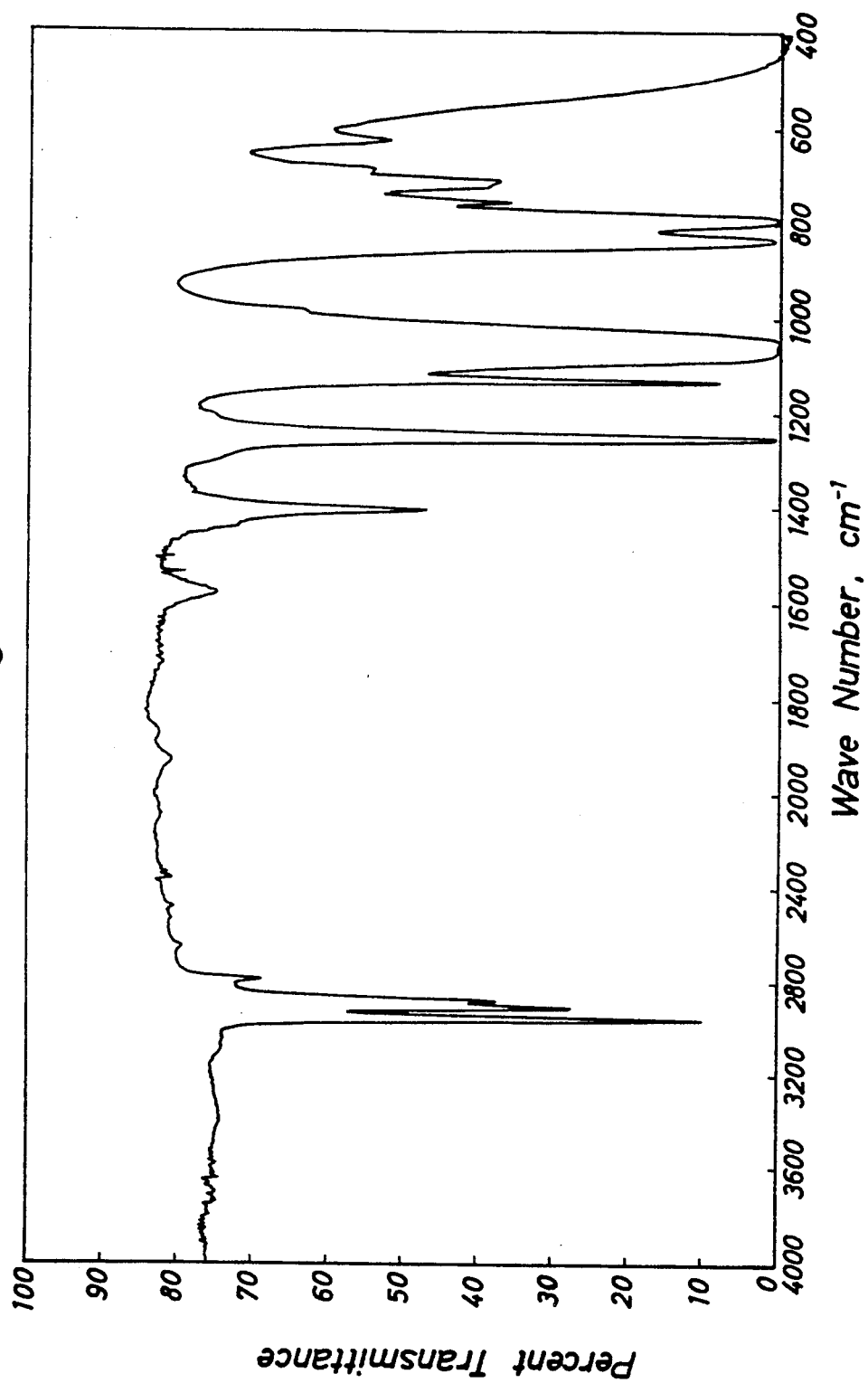
FIG. 2 shows an infrared absorption spectrum of the polymer synthesized in Example 1.

Infrared absorption spectrum
  The chart obtained is shown in FIG. 2.
  Si—O: 1060 cm$^{-1}$
  Si—CH$_3$: 1255 cm$^{-1}$ From the above results it was confirmed that the oily product is a polymer having the following formula:

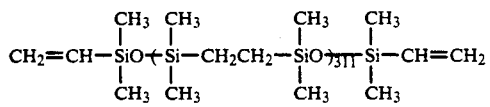

Example 2

A 300-ml four-neck flask equipped with a condenser, agitating blades and a thermometer was charged with 118.4 g (0.3 mol) of a cyclic siloxane having the following formula:

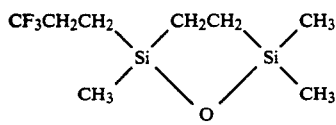

and 558 mg (0.003 mol) of the same divinyldisiloxane as used in Example 1, and the resultant mixture was heated to 100° C. with agitation.

To the liquid mixture was added potassium silanolate in such an amount as to give an Si/K atomic ratio of 5,000, and reaction was carried out at 100° C. for 3 hours, while gradual increase in viscosity occurred. Subsequently, 1 g of acetic acid was added as a neutralizing agent, and the reaction mixture was further matured at 100° C. for 3 hours, then cooled to room temperature and filtered under pressure. The filtrate was stripped by an evaporator under a reduced pressure of 3 mmHg at 100° C. for 2 hours, to yield 106 g of an oily matter.

GPC analysis of the oil showed a monodisperse pattern. Analyses of the oil by vinyl group determination, $^1$H NMR and $^{19}$F NMR techniques gave the following results.

Vinyl group determination
  $4.04 \times 10^{-5}$ mol/g
$^1$H NMR: in CCl$_4$, internal standard: CHCl$_3$
  $\delta$ (ppm)
  0.08 (s, Si—CH$_3$, 9H)
  0.42 (s, Si—CH$_2$CH$_2$—Si, 4H)
  0.85 (t, Si—CH$_2$, 2H)
  1.98 (t, CF$_3$—CH$_2$, 2H)
$^{19}$F NMR: CF$_3$COOH standard
  8.79 ppm CF$_3$—CH$_2$ From the above results it was confirmed that the oily product is a polymer of the following formula:

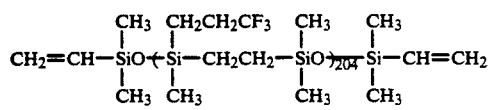

Example 3

A 300-ml four-neck flask equipped with a condenser, agitating blades and a thermometer was charged with 118.4 g (0.2 mol) of a cyclic siloxane having the following formula:

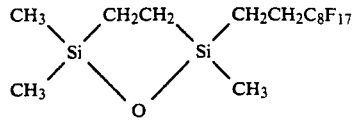

and 186 mg (0.001 mol) of the same divinyldisiloxane as used in Example 1, and the resulting mixture was heated to 100° C. with agitation.

To the liquid mixture, potassium silanolate was added in an amount such as to give an Si/K atomic ratio of 4,500, and reaction was carried out at 100° C. for 3 hours, while the viscosity of the reaction system was rising gradually. Subsequently, 1.2 g of acetic acid as a neutralizing agent was added, and the reaction mixture was further matured at 100° C. for 3 hours, then cooled to room temperature and filtered under pressure. The filtrate was stripped at 100° C. under a reduced pressure of 2 mmHg by an evaporator for 2 hours, to give 108 g of an oily matter.

Figure 3:
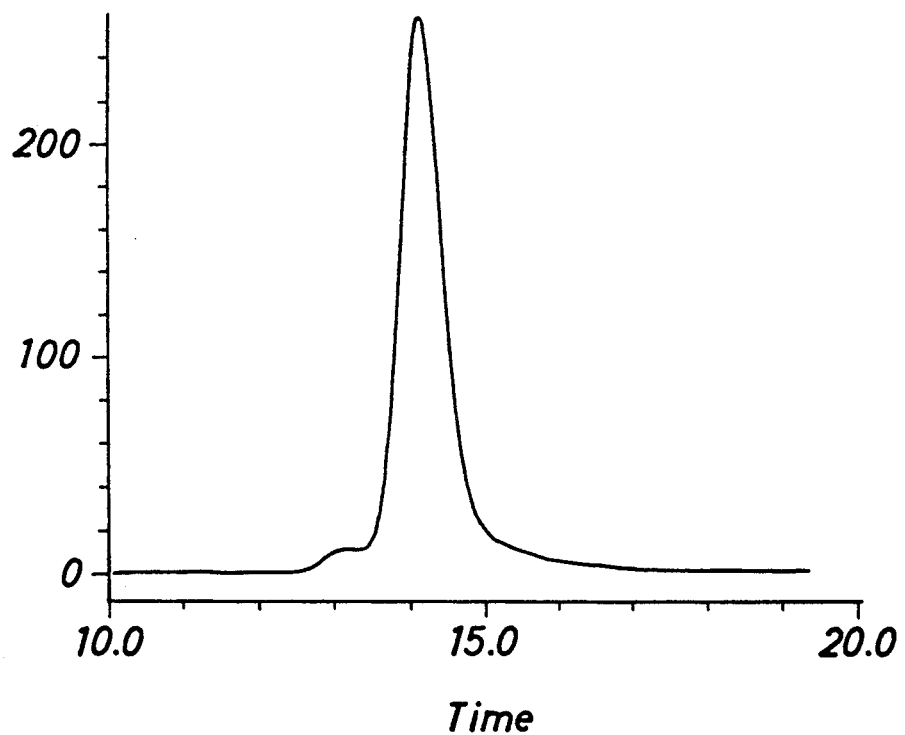
FIG. 3 shows a GPC chart of a polymer synthesized in Example 3.
Figure 4:
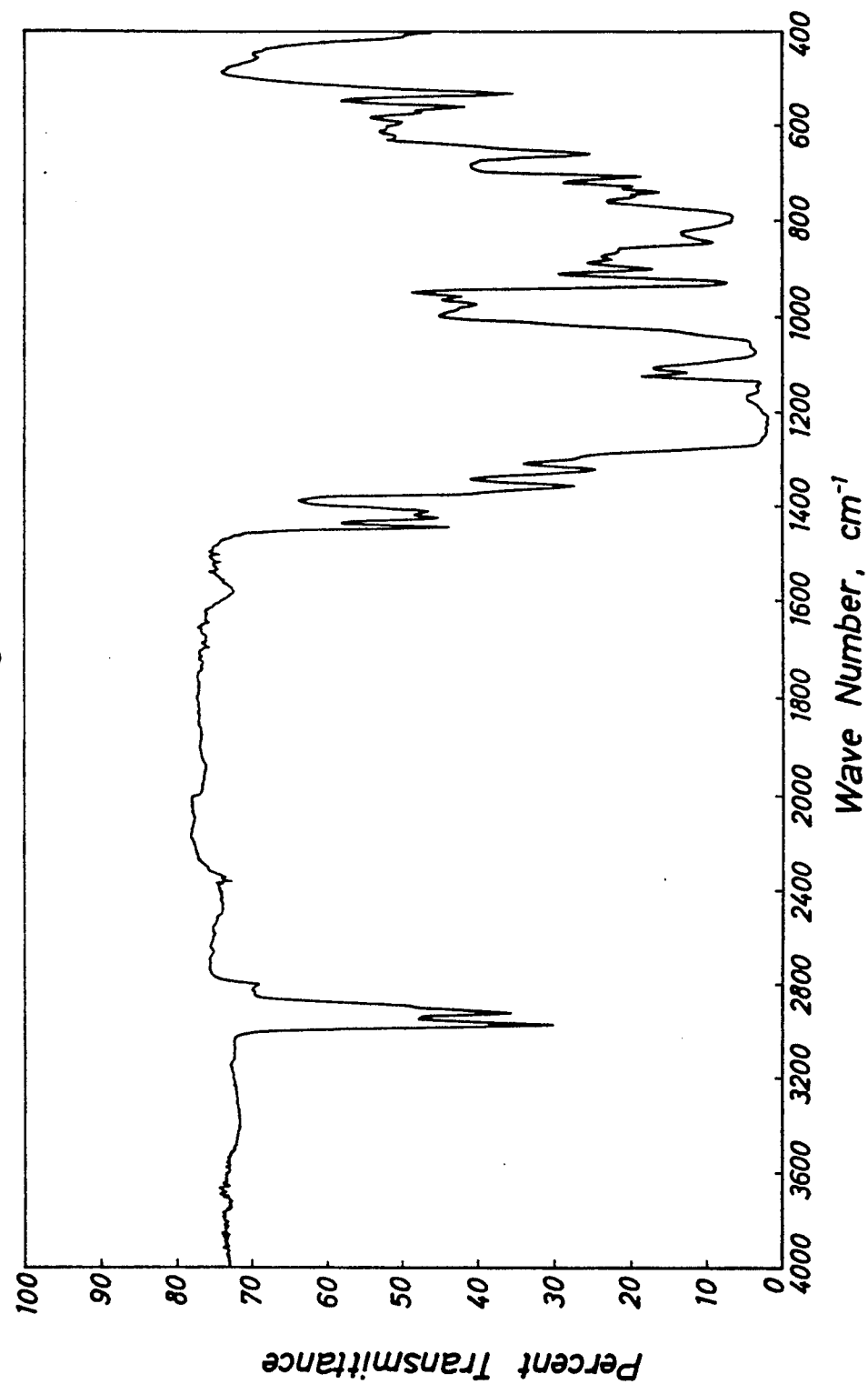
FIG. 4 shows an infrared absorption spectrum of the polymer synthesized in Example 3.

The oily product was analyzed by GPC, vinyl group determination, infrared absorption spectrum, $^1$H NMR and $^{19}$F NMR techniques. The results are as follows.
GPC
  Measuring apparatus: HLC-8020, a product by Tosoh K.K.
  Measuring conditions:
    Column: one G2500 column plus one G4000 column
    Solvent: Fron 113
    Flow rate: 1 ml/min
    Detector: differential refractometer
    Temperature: 35° C.
  The GPC chart obtained is shown in FIG. 3.
  As is seen from the chart, a monodisperse pattern was obtained.
Vinyl group determination
  $1.69 \times 10^{-5}$ mol/g
Infrared absorption spectrum
  The chart obtained is shown in FIG. 4.
  C—F: 1,000–1,400 cm$^{-1}$
$^1$H-NMR: in CCl$_4$, internal standard: CHCl$_3$
  $\delta$ (ppm)
  0.15 (s, Si—CH$_3$, 9H)
  0.53 (s, Si—CH$_2$CH$_2$—Si, 4H)
  0.82 (t, Si—CH$_2$, 2H)
  2 20 (t, CF$_2$—CH$_2$, 2H)
$^{19}$F-NMR: standard: CF$_3$COOH

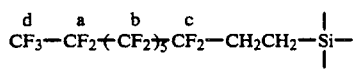

a: $-48.33$ ppm
  b: $-44.59$ ppm
  c: $-38.23$ ppm
  d: $-4.34$ ppm

It was confirmed from the above results that the oily product is a polymer having the following formula:

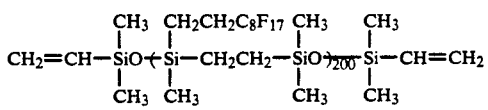

Example 4

A 300-ml four-neck flask equipped with a condenser, agitating blades and a thermometer was charged with 97.2 g (0.3 mol) of a cyclic siloxane having the following formula:

$$\begin{array}{c} CF_3CH_2CH_2 \diagdown \quad CH_2CH_2 \quad \diagup CH_2CH_2CF_3 \\ Si \qquad Si \\ CH_3 \diagup \quad \diagdown O \diagup \quad \diagdown CH_3 \end{array}$$

and 558 mg (0.003 mol) of the same divinyldisiloxane as used in Example 1, and the resulting mixture was heated to 100° C. with agitation.

To the liquid mixture was added potassium silanolate in such an amount as to give an Si/K atomic ratio of 5,000, and reaction was carried out at 100° C. for 3 hours, while the viscosity of the reaction mixture rose gradually. Subsequently, 1 g of acetic acid as a neutralizing agent was added, and the reaction mixture was matured at 100° C. for 3 hours, then cooled to room temperature and filtered under pressure. The filtrate was stripped by an evaporator under a reduced pressure of 3 mmHg at 100° C. for 2 hours, to give 92 g of an oily matter.

The oily product was analyzed by GPC, vinyl group determination, infrared absorption spectrum, $^1$H NMR and $^{19}$F-NMR techniques. The results are set forth below.

Figure 5:
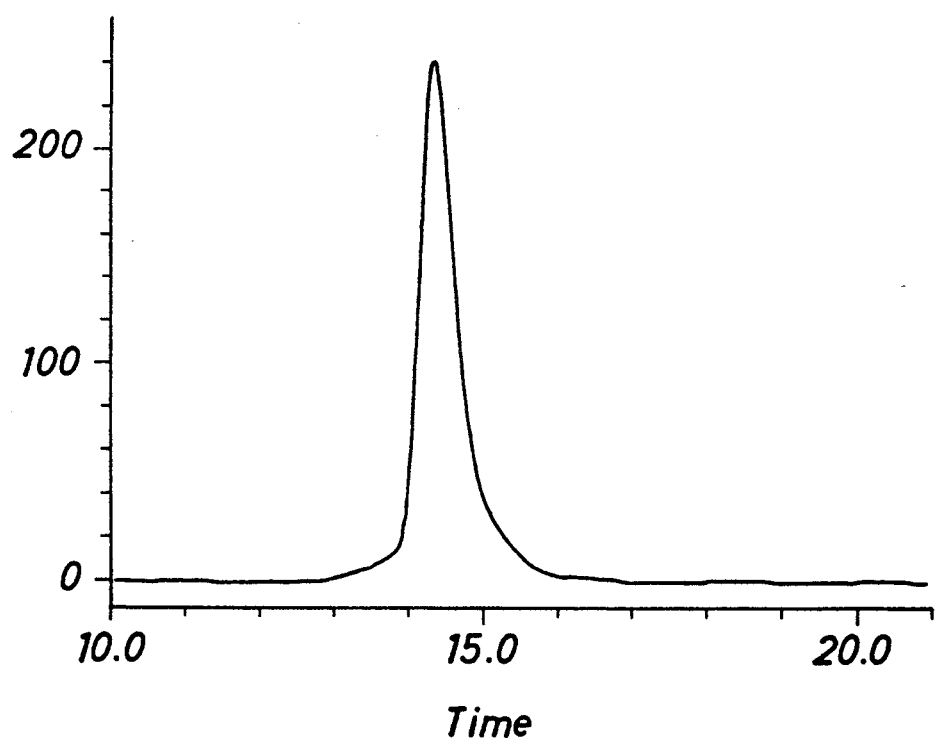
FIG. 5 shows a GPC chart of a polymer synthesized in Example 4.
Figure 6:
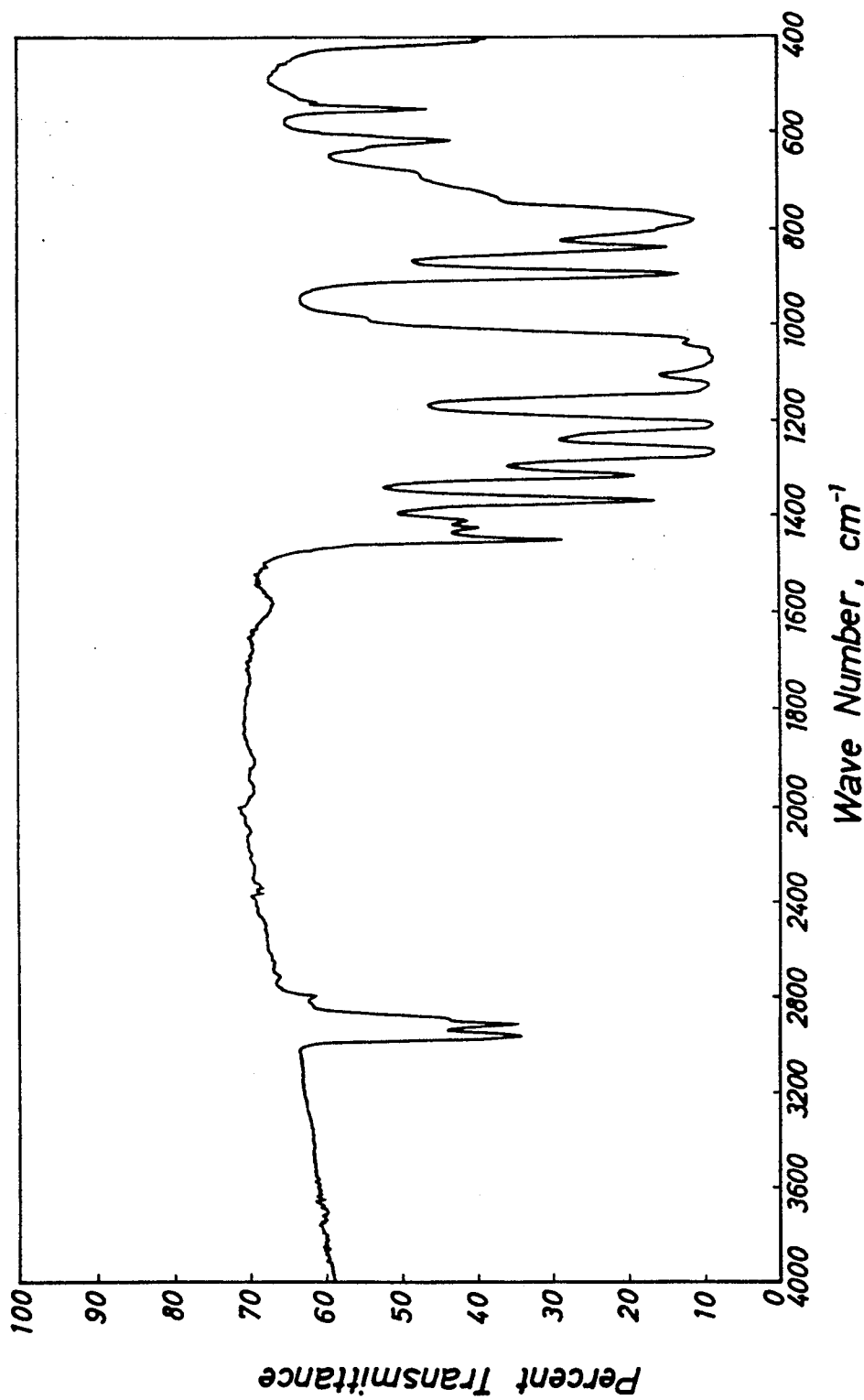
FIG. 6 shows an infrared absorption spectrum of the polymer synthesized in Example 4.

GPC
  Measuring apparatus: HLC-8020, a product by Tosoh K.K.
  Measuring conditions:
    Column: one G2500 column plus one G4000 column
    Solvent: Fron 113
    Flow rate: 1 ml/min
    Detector: differential refractometer
    Temperature: 35° C.
  The GPC chart obtained is shown in FIG. 5.
  As is seen from the chart, a monodisperse pattern was obtained.
Vinyl group determination
  $2.93 \times 10^{-5}$ mol/g
Infrared absorption spectrum
  The chart obtained is shown in FIG. 6.
  C—F: 1,000–1,400 cm$^{-1}$
$^1$H-NMR: in CCl$_4$, internal standard: CHCl$_3$
  δ (ppm)
  0.10 (s, Si—CH$_3$, 6H)
  0.45 (s, Si—CH$_2$CH$_2$—Si, 4H)
  0.80 (t, Si—CH$_2$, 4H)
  2.08 (t, CF$_3$—CH$_2$, 4H)
$^{19}$F-NMR: standard: CF$_3$COOH
  8.90 ppm CF$_3$—CH$_2$ From these results it was confirmed that the oily product is a polymer having the following formula:

$$CH_2=CH-\underset{\underset{CH_3}{|}}{\overset{\overset{CH_3}{|}}{Si}}O\!\!\left(\!\!\underset{\underset{CH_3}{|}}{\overset{\overset{CH_2CH_2CF_3}{|}}{Si}}-CH_2CH_2-\underset{\underset{CH_3}{|}}{\overset{\overset{CH_2CH_2CF_3}{|}}{Si}}O\!\!\right)_{\!\!210}\!\!\underset{\underset{CH_3}{|}}{\overset{\overset{CH_3}{|}}{Si}}-CH=CH_2$$

Example 5

A 300-ml four-neck flask equipped with a condenser, agitating blades and a thermometer was charged with 124.8 g (0.2 mol) of a cyclic siloxane having the following formula:

$$\begin{array}{c} C_4F_9CH_2CH_2 \diagdown \quad CH_2CH_2 \quad \diagup CH_2CH_2C_4F_9 \\ Si \qquad Si \\ CH_3 \diagup \quad \diagdown O \diagup \quad \diagdown CH_3 \end{array}$$

and 149 mg ($8 \times 10^{-4}$ mol) of the divinyldisiloxane used in Example 1, and the resulting mixture was heated to 100° C. with agitation.

To the liquid mixture, potassium silanolate was added in an amount such as to give an Si/K atomic ratio of 4,500, and reaction was carried out at 100° C. for 3 hours, while the viscosity of the reaction mixture rose gradually. Subsequently, 1 g of acetic acid was added as a neutralizing agent, and the reaction mixture was matured at 100° C. for 3 hours, then cooled to room temperature and filtered under pressure. The filtrate was stripped at 100° C. under a reduced pressure of 2 mmHg by an evaporator for 2 hours, to give 118 g of an oily matter.

The oily product was vinyl group determination, infrared absorption spectrum, $^1$H-NMR and $^{19}$F-NMR techniques. The results were as follows.

Figure 7:
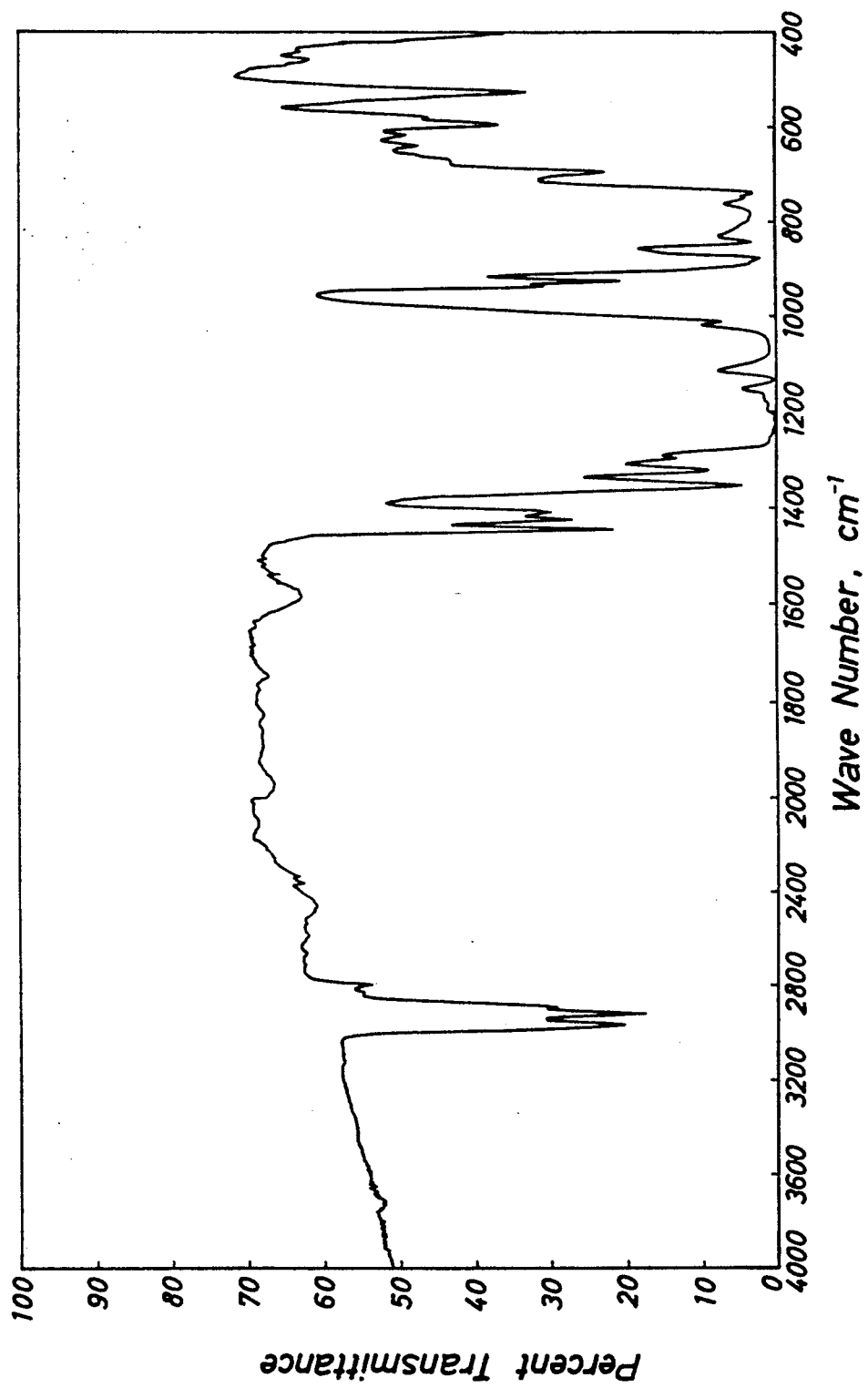
FIG. 7 shows an infrared absorption spectrum of a polymer synthesized in Example 7.

Vinyl group determination
  $1.25 \times 10^{-5}$ mol/g
Infrared absorption spectrum
  The chart obtained is shown in FIG. 7.
  C—F: 1,000–1,400 cm$^{-1}$
$^1$H-NMR: in CCl$_4$, internal standard: CHCl$_3$
  δ (ppm)
  0.23 (s, Si—CH$_3$, 6H)
  0.61 (s, Si—CH$_2$CH$_2$—Si, 4H)
  0.91 (t, Si—CH$_2$, 4H)
  2.12 (t, CF$_2$—CH$_2$, 4H)
$^{19}$F-NMR: standard: CF$_3$COOH $$\overset{d}{CF_3}-\overset{a}{CF_2}-\overset{b}{CF_2}-\overset{c}{CF_2}-CH_2CH_2-\underset{|}{\overset{|}{Si}}-$$

a: −49.16 ppm
  b: −47.40 ppm
  c: −39.49 ppm
  d: −4.87 ppm

It was confirmed from the above results that the oily product is a polymer having the following formula:

$$CH_2=CH-\underset{\underset{CH_3}{|}}{\overset{\overset{CH_3}{|}}{Si}}O\!\!\left(\!\!\underset{\underset{CH_3}{|}}{\overset{\overset{CH_2CH_2C_4F_9}{|}}{Si}}-CH_2CH_2-\underset{\underset{CH_3}{|}}{\overset{\overset{CH_2CH_2C_4F_9}{|}}{Si}}O\!\!\right)_{\!\!256}\!\!\underset{\underset{CH_3}{|}}{\overset{\overset{CH_3}{|}}{Si}}-CH=CH_2$$

We claim:
1. A polysilethylenesiloxane having the following general formula [I]:

$$CH_2=CH-\underset{\underset{R}{|}}{\overset{\overset{R}{|}}{Si}}O\!\!\left(\!\!\underset{\underset{R}{|}}{\overset{\overset{R^1}{|}}{Si}}-CH_2CH_2-\underset{\underset{R}{|}}{\overset{\overset{R^2}{|}}{Si}}O\!\!\right)_{\!\!n}\!\!\underset{\underset{R}{|}}{\overset{\overset{R}{|}}{Si}}-CH=CH_2 \qquad [I]$$

wherein R may be the same or different and are each a monovalent hydrocarbon group of from 1 to 10 carbon atoms, $R^1$ and $R^2$ may be the same or different and are each a monovalent hydrocarbon group of from 1 to 10 carbon atoms or a perfluoroalkylethyl group, and n is an integer of from 10 to 1,000.

2. The polysilethylenesiloxane according to claim 1, wherein R, $R^1$ and $R^2$ in the general formula [I] may be the same or different and are each a lower alkyl group of up to 8 carbon atoms.

3. The polysilethylenesiloxane according to claim 2, wherein all of R, $R^1$ and $R^2$ in the general formula [I] are methyl.

4. The polysilethylenesiloxane according to claim 1, wherein one of $R^1$ and $R^2$ in the general formula [I] is a perfluoroalkyl group.

5. The polysilethylenesiloxane according to claim 1, wherein both $R^1$ and $R^2$ in the general formula [I] are a perfluoroalkylethyl group.

6. The polysilethylenesiloxane according to claim 4, wherein the perfluoroalkylethyl group has up to 10 carbon atoms.

7. The polysilethylenesiloxane according to claim 5, wherein the perfluoroalkylethyl group has up to 10 carbon atoms.

8. The polysilethylenesiloxane according to claim 6, wherein the perfluoroalkylethyl group is a group selected from the group consisting of $CF_3CH_2CH_2-$, $(CF_3)_2CFCH_2CH_2-$, $C_4F_9CH_2CH_2-$, $C_6F_{13}CH_2CH_2-$, $C_8F_{17}CH_2CH_2-$, and $C_{10}F_{21}CH_2CH_2-$.

9. The polysilethylenesiloxane according to claim 7, wherein the perfluoroalkylethyl group is a group selected from the group consisting of $CF_3CH_2CH_2-$, $(CF_3)_2CFCH_2CH_2-$, $C_4F_9CH_2CH_2-$, $C_6F_{13}CH_2CH_2-$, $C_8F_{17}CH_2CH_2-$, and $C_{10}F_{21}CH_2CH_2-$.

* * * * *